United States Patent [19]
Matson

[11] Patent Number: 5,774,123
[45] Date of Patent: *Jun. 30, 1998

[54] APPARATUS AND METHOD FOR ENHANCING NAVIGATION OF AN ON-LINE MULTIPLE-RESOURCE INFORMATION SERVICE

[75] Inventor: David J. Matson, San Diego, Calif.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 572,980

[22] Filed: Dec. 15, 1995

[51] Int. Cl.$^6$ .................................................. G06F 17/30
[52] U.S. Cl. .......................................... 345/357; 345/356
[58] Field of Search .................................. 345/357, 356, 345/352, 348, 396, 393, 340, 326, 347, 614

[56] References Cited

U.S. PATENT DOCUMENTS

| | | | |
|---|---|---|---|
| 5,247,575 | 9/1993 | Sprague et al. | 380/9 |
| 5,481,542 | 1/1996 | Logston et al. | 370/94 |
| 5,500,938 | 3/1996 | Cahill et al. | 395/326 |
| 5,572,643 | 11/1996 | Judson | 395/793 |
| 5,625,818 | 4/1997 | Zarmer et al. | 395/615 |
| 5,630,125 | 5/1997 | Zellweger | 395/614 |

OTHER PUBLICATIONS

Computer Networks and ISDN Systems; vol. 28, No. 1/02, Dec. 1995; pp. 147–154, XP000616707; Author: Jong–Gyun Lim; Title: Using Coolists to Index HTML Documents in the Web.

Computer Networks and ISDN Systems; vol. 27, No. 1 Jan. 1995; pp. 1075–1087, XP000579907; Author: Sougata Mukherjea, et al.; Title: Visualizing the World–Wide Web with the Navigational View Builder.

Primary Examiner—Raymond J. Bayerl
Assistant Examiner—Steven P. Sax
Attorney, Agent, or Firm—Merchant, Gould, Smith, Edell, Welter & Schmidt

[57] ABSTRACT

An apparatus, method, and article of manufacture for enhancing navigation of an on-line multiple-resource information service is disclosed. A navigation agent is selectively activated by a user when navigating through the on-line information service, such as the Internet, and effects recording of navigation information while the user navigates through the information service. The recorded navigation information may be categorized in a manner useful to the user and stored as part of a collection of categorized navigation information for later use. The navigation information recorded by the navigation agent may be formatted in the form of a navigation script representing computer input device information received from a user, information service address information received from the user or the information service, or a combination of this and other information associated with navigating through the information service. A selected navigation script may be executed by the user to arrive at an end destination defined in the script or, alternatively, executed in a step-through manner to permit user-evaluation of intermediate locations along a previously traversed navigation path.

19 Claims, 6 Drawing Sheets

| | NAVIGATION LOCATION | "X" PARAMETER | "Y" PARAMETER | IP ADDRESS | WINDOW SCALE FACTOR |
|---|---|---|---|---|---|
| 110 | A0 | $X_{A0}$ | $Y_{A0}$ | $IPA_A$ | 1 |
| 112 | A1 | $X_{A1}$ | $Y_{A1}$ | $IPA_A$ | 0.8 |
| 114 | A2 | $X_{A2}$ | $Y_{A2}$ | $IPA_A$ | 1 |
| 116 | B0 | $X_{B0}$ | $Y_{B0}$ | $IPA_B$ | 1 |
| 118 | C0 | $X_{C0}$ | $Y_{C0}$ | $IPA_C$ | 0.5 |
| 120 | C1 | $X_{C1}$ | $Y_{C1}$ | $IPA_C$ | 0.6 |
| 122 | C2 | $X_{C2}$ | $Y_{C2}$ | $IPA_C$ | 1 |

APPARATUS AND METHOD FOR ENHANCING NAVIGATION OF AN ON-LINE MULTIPLE-RESOURCE INFORMATION SERVICE

BACKGROUND OF THE INVENTIONS

1. Field of the Invention

The present invention relates generally to computer software and systems, and more particularly, to an apparatus and method for enhancing navigation of an on-line multiple-resource information system.

2. Description of the Related Art

Widespread use of on-line information services has led to a proliferation of computer-implemented software designed to enhance communication with such information services. Recently, the World-Wide WEB (WEB) has provided users a practical means for navigating the Internet and accessing its vast inventory of information, which encompasses a wide range of subject matter. The Internet continues to be used extensively as an important research tool due in large part to its extensive scope of information resources. Adoption of the TCP/IP protocol (Transmission Control Protocol/Internet Protocol) in the early 1980s and sponsorship of this standard protocol by DARPA (Defense Advanced Research Projects Agency) and the Office of the Secretary of Defense permitted universities, government laboratories, the National Science Foundation, and corporate research laboratories the ability to communicate scientific and technical information over a commonly accessible wide area network.

The Internet currently comprises a large number of connected information networks that act as a coordinated whole. A significant advantage of the Internet is that it provides universal interconnection while allowing users to use any desired hardware best suited for individual needs.

Although the Internet provides researchers and other users the ability to access a broad spectrum of information, it is well-appreciated that this amalgam of disparate information resources presents a sizable challenge when attempting to locate specific information of interest contained therein. Moreover, the inherent lack of organization with respect to the many information resources made accessible through the Internet makes even the apparently simple task of finding a previously located document or information service difficult.

There exists a need in the communications industry for a tool that enhances navigation of an on-line multiple-resource information service, such as the Internet. There exists a further need for such a tool that assists a user in researching subject matter of interest that is distributed throughout the information service. The present invention fulfills these and other needs.

SUMMARY OF THE INVENTION

To overcome the limitations in the prior art described above, and to overcome other limitations that will become apparent upon reading and understanding the present specification, the present invention discloses a method, apparatus, and article of manufacture for enhancing navigation of an on-line multiple-resource information service. A navigation agent is selectively activated by a user when navigating through the on-line information service, such as the Internet, and effects recording of navigation information while the user navigates through the information service. The recorded navigation information may be categorized in a manner useful to the user and stored as part of a collection of categorized navigation information for later use. Research performed by the user is substantially enhanced by selectively executing previously recorded navigation information retrieved from a bookshelf or library of previously recorded navigation information.

The navigation information recorded by the navigation agent may be formatted in the form of a navigation script representing computer input device information received from a user, information service address information received from the user or the information service, or a combination of this and other information associated with navigating through the information service. It is to be understood that the term script as used herein is not limited to a series of input device parameters, such as keyboard entry information. A selected navigation script may be executed by the user to arrive at an end destination defined in the script or, alternatively, executed in a step-through manner to permit user-evaluation of intermediate locations along a previously traversed navigation path. A user may temporarily break the execution of a navigation script as desired and subsequently return to the break location to resume navigation script execution.

The navigation agent may be activated to perform an optimization routine by which redundant navigation information is eliminated from a recorded navigation script. A selected navigation script may alternatively be executed at a user-specified time, and may be further programmed to update a previously retrieved document from the on-line information service for purposes of retaining the most current version of the document.

It is an object of the present invention to provide an apparatus and method for enhancing computer-implemented navigation of an on-line multiple-resource information service.

It is another object of the present invention to provide an apparatus and method for recording navigation information while navigating through various information resources made available to a user through an on-line multiple-resource information service.

It is a further object of the present invention to provide an apparatus and method for recording all or a portion of a navigation or search session, and for storing the recorded navigation session in an organized manner as part of a collection of recorded navigation sessions.

It is another object of the present invention to retrace a previously traversed search path by selecting a previously recorded navigation script and executing the selected navigation script.

It is yet another object of the present invention to optimize a recorded navigation script by eliminating redundant navigation information contained in a navigation script.

It is a further object of the present invention to provide a collection of recorded navigation scripts organized in accordance with a user-specified organization scheme.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
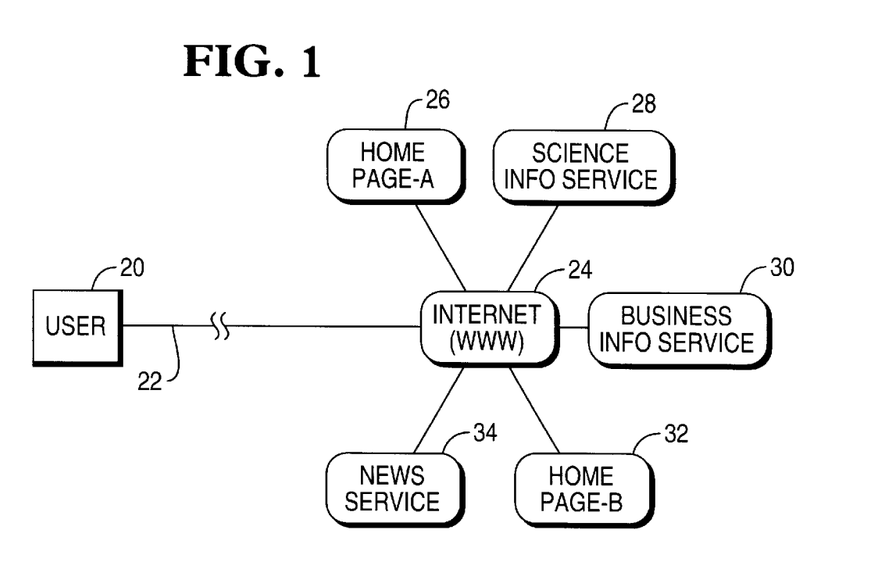
FIG. 1 is a graphical representation of an on-line multiple-resource information service, such as the Internet, accessible to a plurality of remote users.

Referring now to FIG. 1, there is illustrated a depiction of an on-line multiple-resource information service 24 which is accessible to any number of remotely located users 20 over a communication line 22. In the embodiment illustrated in FIG. 1, a remotely located user 20 may access a plurality of information resources by connecting to the Internet 24 through the use of the World-Wide WEB or other Internet interface application. A user 20, for example, may employ a WEB browser to navigate the Internet 24 and access any number of information resources, such as a homepage-A 26, a science information service 28, a business information service 30, a homepage-B 32, and a news service 34. As discussed previously, the vast number of information resources made accessible to a user through the use of the WEB presents a difficult challenge when attempting to locate specific information of interest.

Figure 2:
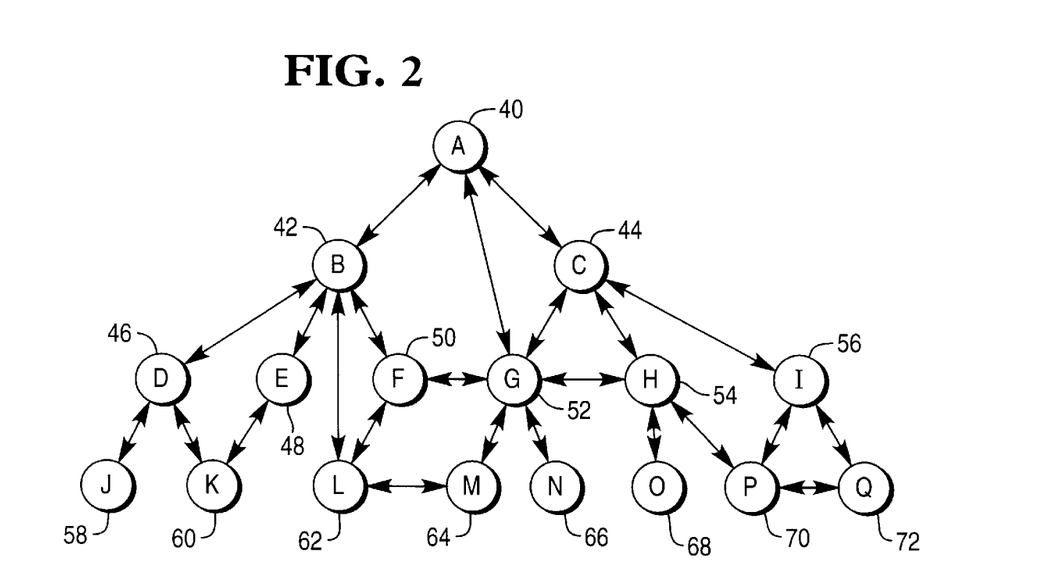
FIG. 2 is a graphical depiction of a map of navigation locations traversed by user while navigating an on-line multiple-resource information service.

A research effort, as depicted in FIG. 2, may be initiated at a homepage or other WEB site indicated as location A 40. A researcher may then move to other locations within the same document or information resource indicated as location A 40 or branch from location A 40 to another information resource, such as the one represented as location G 52. Those skilled in the art will appreciate that many of the navigation locations traversable by a user may include multiple branching options, often referred to as hypertext links or hot links. Moreover, a WEB homepage or site that includes several of such branching options is generally regarded as a preferred site for conducting a research effort. It can be appreciated that the advantageous use of multiple branching options at numerous WEB sites significantly increases the probability of re-traversing a previously investigated search path, thus increasing the inefficiency of the research effort.

A researcher, for example, may branch from location A 40 to location B 42, followed by a subsequent branch from location B 42 to locations F 50, G 52, H 54, and eventually to location O 68 which contains a document of interest. Alternatively, the desired document residing at location O 68 may be located by traversing a more efficient navigation path defined by locations A 40, C 44, H 54, and finally O 68. A less desirable and inefficient navigation path traversed by a researcher to locate the document of interest residing at location O 68 may be defined by locations A 40, B 42, L 62, F 50, G 52, H 54, C 44, G 52, H 54, and finally O 68. It is noted that this inefficient navigation route includes a redundant navigation path over which the researcher re-traversed in order to arrive at the desired document or location represented by location O 68.

It can be appreciated that searching and navigating through the Internet to arrive at destinations containing useful information can be a time-consuming and inefficient process. The inherent inefficiencies when navigating the Internet in a conventional manner are made further evident by the current need to write down a productive navigation path in order to make more efficient the process of subsequently traversing the navigation path to a desired end or intermediate destination. It can be further appreciated that the process of manually recording the cryptic navigation path information on a sheet of paper for subsequent use is subject to varying degrees of inaccuracy. Further, the navigation path preserved by the researcher in written form must be analyzed to detect and eliminate any redundancies that might exist along the navigation route.

The navigation agent of the present invention provides a user of an on-line multiple-resource information service, such as the Internet, the ability to record navigation information in real-time while navigating through the information service, to store the recorded navigation information in a non-volatile form, and, at a later time, process the stored navigation information to effectively re-trace through a productive navigation path. Recorded navigation information may be categorized in accordance with a user-specified categorization scheme and incorporated as part of a larger collection or bookshelf of navigation information. As such, a user may build and add to a library of navigation information organized in a manner suited to meet a particular user's needs.

The navigation agent may also be employed to perform other tasks, such as optimizing recorded navigation information by eliminating redundant or duplicative portions of the navigation information. The navigation agent may further be employed to process previously recorded navigation information in order to locate a desired document stored in the information service. The desired document may then be compared to a previously obtained version of the desired document for purposes of retaining the latest version of the desired document.

Figure 3:
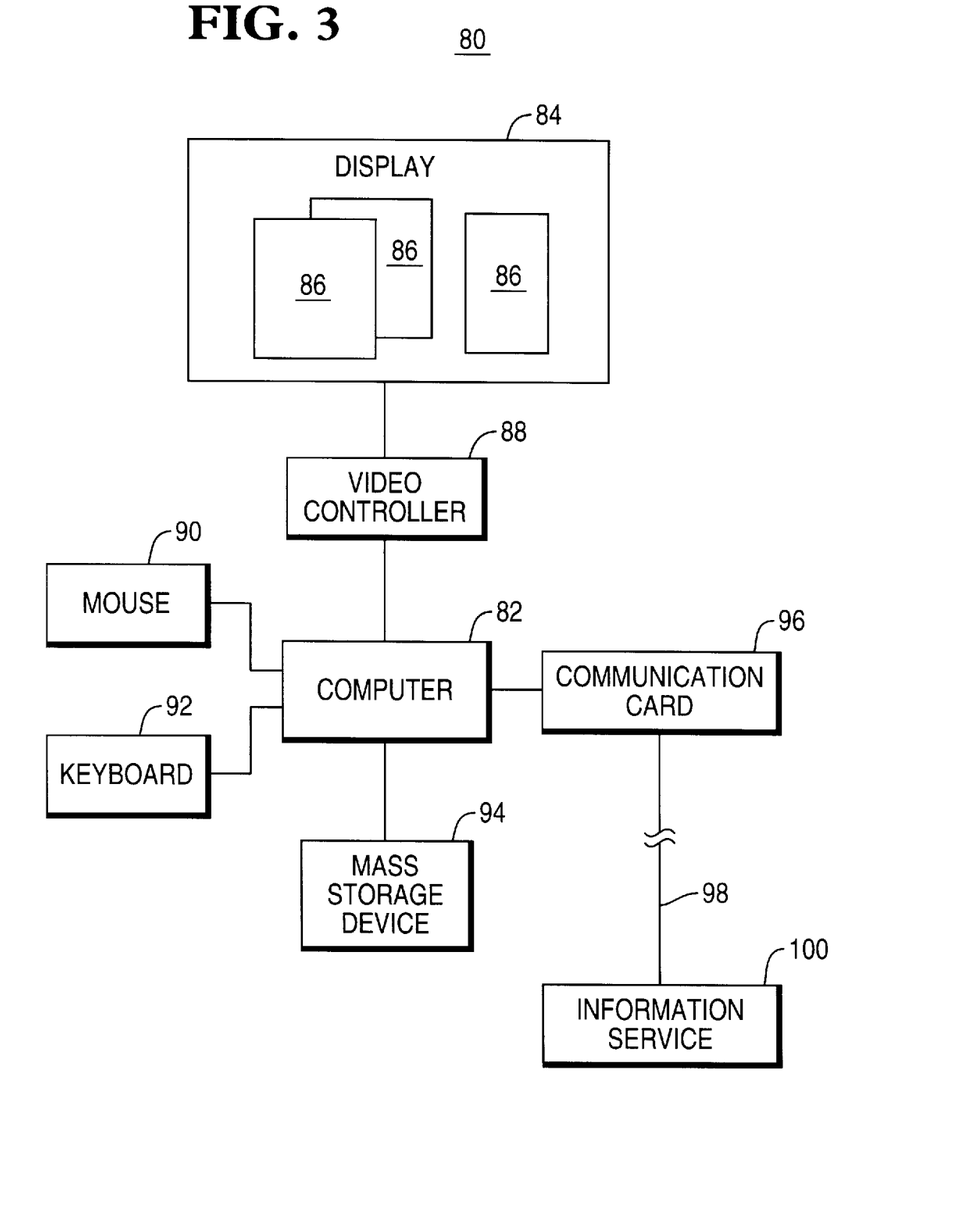
FIG. 3 is a system block diagram of an apparatus for enhancing computer-implemented navigation of an on-line multiple-resource information service.

Turning now to FIG. 3, there is illustrated one embodiment of an apparatus for enhancing navigation of an on-line multiple-resource information service by employment of a navigation agent in accordance with the present invention. In FIG. 3, there is shown a computer system 80 through which a user communicates with an on-line information service 100. The computer system 80 includes a computer 82 within which is housed a central processing unit (CPU), internal RAM and ROM memory, and a bus architecture for coupling the computer 82 to various internal and external components. The computer system 80 further includes a communication card 96 which, in turn, is coupled to a communication channel 98 for effecting communication with the information service 100. A mass storage device 94, such as a hard disk drive or floppy disk drive or CD-ROM drive, is coupled to the computer 82 for storing navigation information, application software, and other data. The present invention is typically embodied in application software executed or performed by the computer 82, which software may be stored, for example, in the memory of the computer 82 and/or on the mass storage device 94.

A user-actuatable input device is also coupled to the computer 82. As illustrated in FIG. 3, two such user-actuatable input devices include a mouse 90 and a keyboard 92. It is to be understood that the input device depicted as the mouse 90, and the term mouse used herein, is representative of any number of input devices that produce signals corresponding to a cursor location on the display 84. By way of example, the mouse 90 may instead be substituted with a trackball, an electronic pen, or a touch-pad. A display 84 is coupled to the computer 82 through a video controller 88. The video controller 88 coordinates the presentation of information on the display 84 in one or more windows 86. Generally, the windows 86 are scalable, thus permitting a user to define the size and location of a particular window 86 on the display 84.

Figure 4:
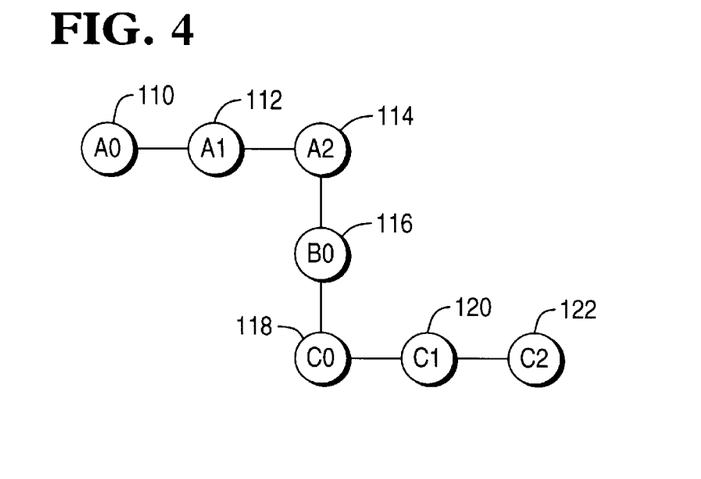
FIG. 4 is a depiction of a navigation map corresponding to a plurality of navigation locations traversed by a user while navigating an on-line multiple-resource information service.

Referring now to FIG. 4, there is provided an illustration of a navigation path traversed by a user when navigating an on-line multiple-resource information service. In accordance with this illustrative example, a user initiates navigation of the information service at location A0 110 and completes the navigation path at location C2 122. In this example, locations A0 110, B0 116, and C0 118 each represent distinct branch locations within the information service, such as homepages, or documents that are typically arrived at by branching (e.g., hypertext linking) from another distinct branch location or document. Locations A1 112 and A2 114, in contrast, represent unique locations within the distinct branch location or document identified as A0 110. Similarly, locations C1 120 and C2 122 represent unique locations within the distinct branch location or document identified as C0 118.

By way of example, it is assumed that a first WEB homepage resides at location A0 110, and that locations A1 112 and A2 114 respectively represent unique locations within the WEB homepage residing at location A0 110. In a similar manner, locations C1 120 and C2 122 represent unique locations within a third WEB homepage residing at location C0 118. In the example illustrated in FIG. 4, a user initiates a navigation session at the first WEB homepage residing at location A0 110, moves within the first WEB homepage to a location A1 112, and then moves to another location A2 114. At location A2 114, the user effects a branch to the second WEB homepage residing at location B0 116. The user then branches from the second WEB homepage residing at B0 116 to the third WEB homepage residing at location C0 118, and progresses to locations C1 120 and finally to location C2 122 within the third WEB homepage which contains information of interest.

The navigation agent of the present invention is employed to effect recording of navigation information associated with a user's progression through the navigation path illustrated in FIG. 4. In accordance with one embodiment, as is further illustrated in FIG. 5, the navigation agent is employed to record horizontal (X) and vertical (Y) parameters associated with the location of the cursor on the display 84. The X and Y parameters may be derived by signals produced by a mouse 90 or other similar input device coupled to the computer 82. At location A0 110, for example, the location of the cursor on the display 84 is represented by the cursor parameters $X_{A0}$ and $Y_{A0}$. Upon clicking the mouse 90 at location A1 112, a second set of cursor parameters, $X_{A1}$ and $Y_{A1}$, are recorded.

Moving to location A2 114 and clicking the mouse 90 causes the navigation agent to effect recording of cursor parameters $X_{A2}$ and $Y_{A2}$. It is noted that clicking the mouse 90 at location A2 114 initiates a branch to a new document or location B0 116. The cursor parameters associated with the progression along the navigation path between locations B0 116 and C2 122 are similarly recorded. In accordance with this embodiment, a navigation script is thus produced as a series of cursor position parameters associated with each of the navigation locations encountered between the initial location A0 110 and the destination location C2 122. This navigation script is then stored in the mass storage device 94, or, alternatively, at a location within the information service. The stored navigation script may be subsequently retrieved and executed to repeat the excursion along the navigation path illustrated in FIG. 4.

In another embodiment, additional navigation information is recorded as a user navigates along a desired path within an on-line information service. Still referring to FIGS. 4 and 5, Internet protocol address (IPA) information may be recorded at each navigation location in addition to cursor position parameters. At location A0 110, for example, the IP address $IPA_A$ is recorded along with cursor position parameters $X_{A0}$ and $Y_{A0}$. The IP address information may be recorded at each of the locations associated with a navigation path or, alternatively, at each distinct branch location, such as a homepage. It is noted that the IP address information may be obtained from information input through the keyboard 92, such as a URL typed in by a user, or by capturing URL or other IP address information transmitted to the WEB browser or other communication interface software from the information service 100.

Figure 5:
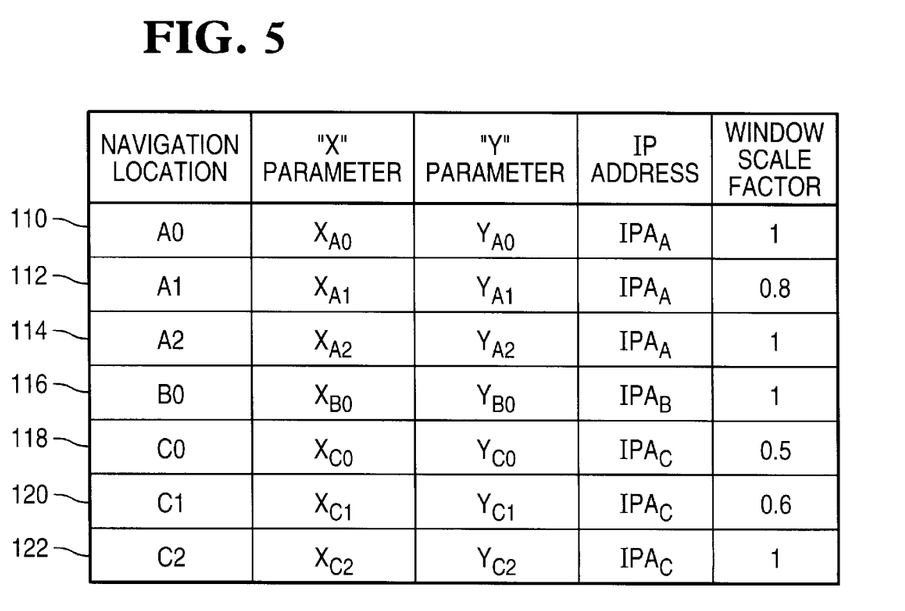
FIG. 5 is a chart of navigation information associated with each of the navigation locations depicted in FIG. 4.

Other information regarding the relationship of the cursor position and the display 84 may be included in the recorded navigation information. Depending on the configuration of the computer system 80, the video controller 88 and display 84 may support one or more windows 86, within which a corresponding number of application software programs may be operated. It can be appreciated that a scalable window 86 is one that can be modified by a user during a search session. Accordingly, the X and Y parameter information associated with cursor position can be affected by changes in the location and dimensions of a particular window 86. It may therefore be desirable to maximize the applicable window 86 of the display 84 prior to recording navigation information. A window scale factor of 1, as shown in FIG. 5, is representative of a maximized window 86 condition.

The user, however, may wish to concurrently open a number of windows 86 during a research effort, with one of the windows 86 being used to navigate an on-line information service. In this situation, it is desirable to record window scale information and window location information (now shown in FIG. 5) in addition to X and Y cursor position information. Upon arriving at search location C0 118, for example, the navigation agent preferably effects recording of cursor position parameters $X_{C0}$ and $Y_{C0}$, the IP address $IPA_C$, a window scale factor of 0.5 (i.e., a fifty percent size reduction of a maximized window), and any applicable window location parameters. This and any other relevant window or display information required to accurately define cursor position within a particular window 86 is preferably incorporated as part of the recorded navigation information. It is noted that in general practice, window re-sizing is performed infrequently, and typically only once prior to initiating a research session.

Figure 6:
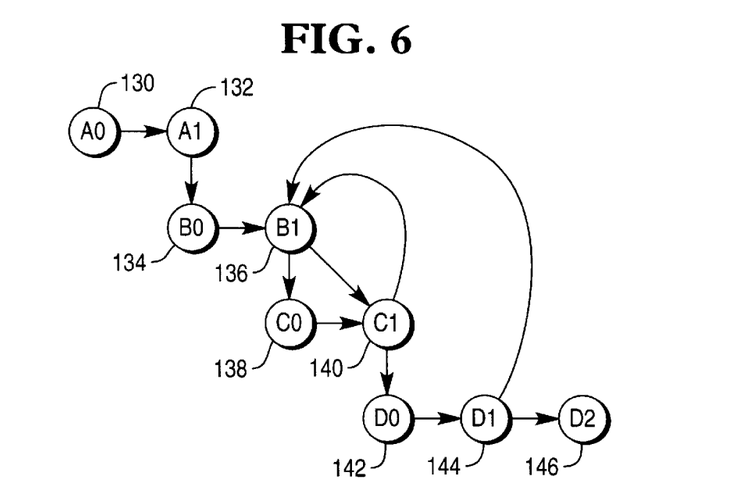
FIG. 6 is a depiction of a navigation map of a plurality of navigation locations traversed by a user while navigating an on-line multiple-resource information service.
Figure 7:
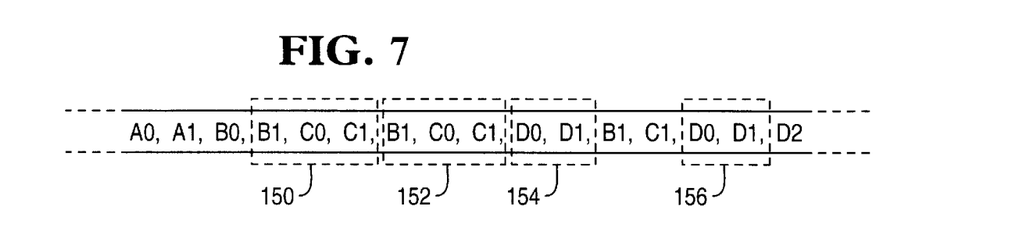
FIG. 7 is an illustrative navigation script corresponding to the navigation map illustrated in FIG. 6, including redundant navigation information resulting from duplicatively traversing a portion of the navigation route.

One advantage of employing the navigation agent of the present invention concerns the optimization of a search strategy or navigation path. Referring now to FIGS. 6 and 7, there is illustrated a depiction of a navigation path developed as a part of a search strategy, including redundant or duplicative sub-paths. With respect to FIG. 6, it is assumed that a desired document is eventually located by a user at location D2 146 after initiating the search at location A0 130. In accordance with this illustrative example, the user's search progresses along a navigation path indicated as A0 130, A1 132, B0 134, B1 136, C0 138, and then C1 140. At location C1 140, the user either purposefully or unintentionally branches to the previously visited location B1 136. The user once again progresses from location B1 136 to C0 138, C1 140, and then to new locations D0 142 and D1 144. At location D1 144, the user once again branches to previously visited location B1 136, and progresses along a duplicative path represented by C0 138, C1 140, D0 142, D1 144. The user finally arrives at new location D2 146 which contains a useful document or other useful information.

As shown in FIG. 7, the previously described navigation path includes two pairs of redundant or duplicative sub-paths 150, 152 and 154, 156, respectively. The navigation agent preferably performs an optimization routine by which the duplicative sub-paths are eliminated from the recorded navigation path information. The sub-path 152, containing route locations B1 136, C0 138, and C1 140, for example, is duplicative of the sub-path 150. The navigation agent effects the elimination of one of redundant sub-paths 150 or 152. The navigation agent further optimizes the recorded navigation path by eliminating one of the duplicative sub-paths 154 or 156. Those skilled in the art will appreciate that various known schemes for eliminating (e.g., automatically editing) the duplicative or redundant sub-path information may be suitably employed by the navigation agent.

In one embodiment, the navigation agent optimizes a recorded navigation script and stores the optimized navigation script under a name different from that of the original navigation script. In a subsequent search session, a user may test the optimized navigation script in order to verify its equivalence to the original navigation script. After verification of equivalence, the original navigation script can be deleted from storage in favor of the optimized navigation script.

Another important advantage of the navigation agent concerns the compilation or collection of navigation information organized in a manner most useful to a particular user or researcher. A library of navigation information preferably includes electronic copies of books, articles, documents, graphic objects, sound objects, photographs, video objects, and the like, as well as pointers that identify the location of such information. The library, in turn, preferably includes a number of bookshelves containing particular navigation information or pointers corresponding to the locations of particular navigation information selected from the totality of navigation information provided in the library. A researcher, for example, may store and retrieve related navigation information, referred to often herein as scripts, from a designated bookshelf.

Figure 8:
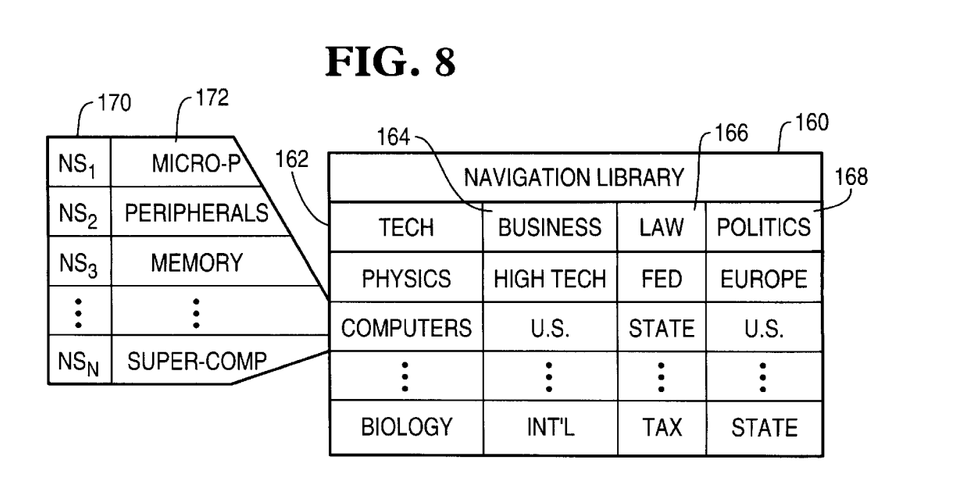
FIG. 8 is an illustration of a navigation script bookshelf containing a collection of navigation scripts organized in a manner useful to a user.

As illustrated in FIG. 8, a navigation library 160 is preferably organized to include a number of navigation bookshelves 162, 164, 166, and 168. The library 160 depicted in FIG. 8, for example, is organized to include a bookshelf 162 containing technical information, a bookshelf 164 containing business information, a bookshelf 166 containing legal information, and a bookshelf 168 containing political information. Each of the bookshelves, in turn, may further include a number of categories and sub-categories to which individual recorded navigation scripts may be associated. For example, the bookshelf 162 may include a number of categories including physics, computers, and biology.

The computers category illustrated in FIG. 8, for example, may include a number of sub-categories associated with computer-specific navigation scripts stored with a suitable descriptive title. Each of the navigation scripts 170 associated with a particular category or sub-category is preferably identified by a unique name 172, such as microprocessor. It can be appreciated that any number of categorization schemes may be employed to best suit a particular researcher's specific needs when organizing a plurality of executable, previously recorded navigation scripts.

Figure 9:
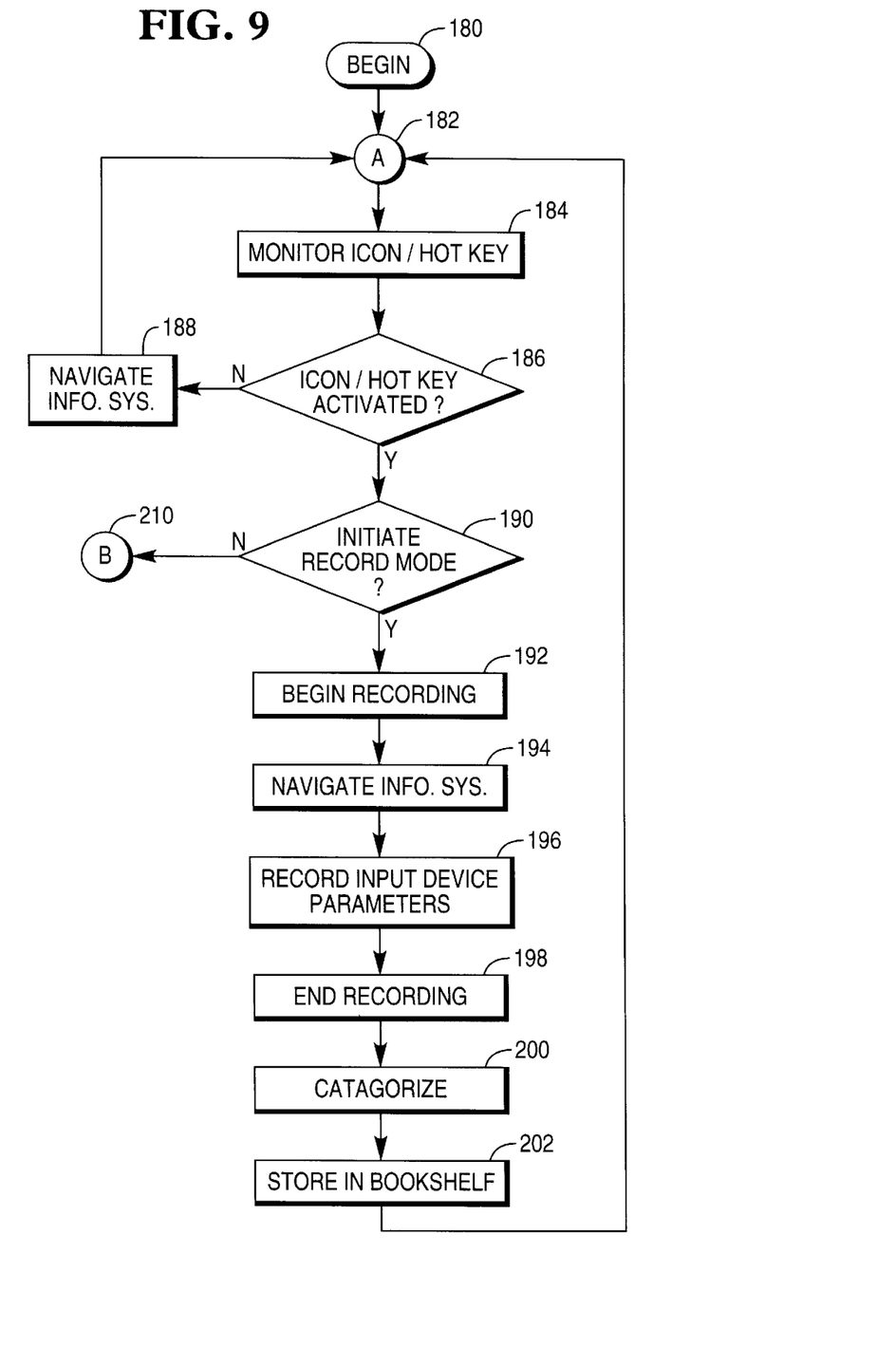
FIGS. 9–10 depict in flow diagram form a method for enhancing of an on-line multiple-resource information service by employing a novel navigation agent.
Figure 10:
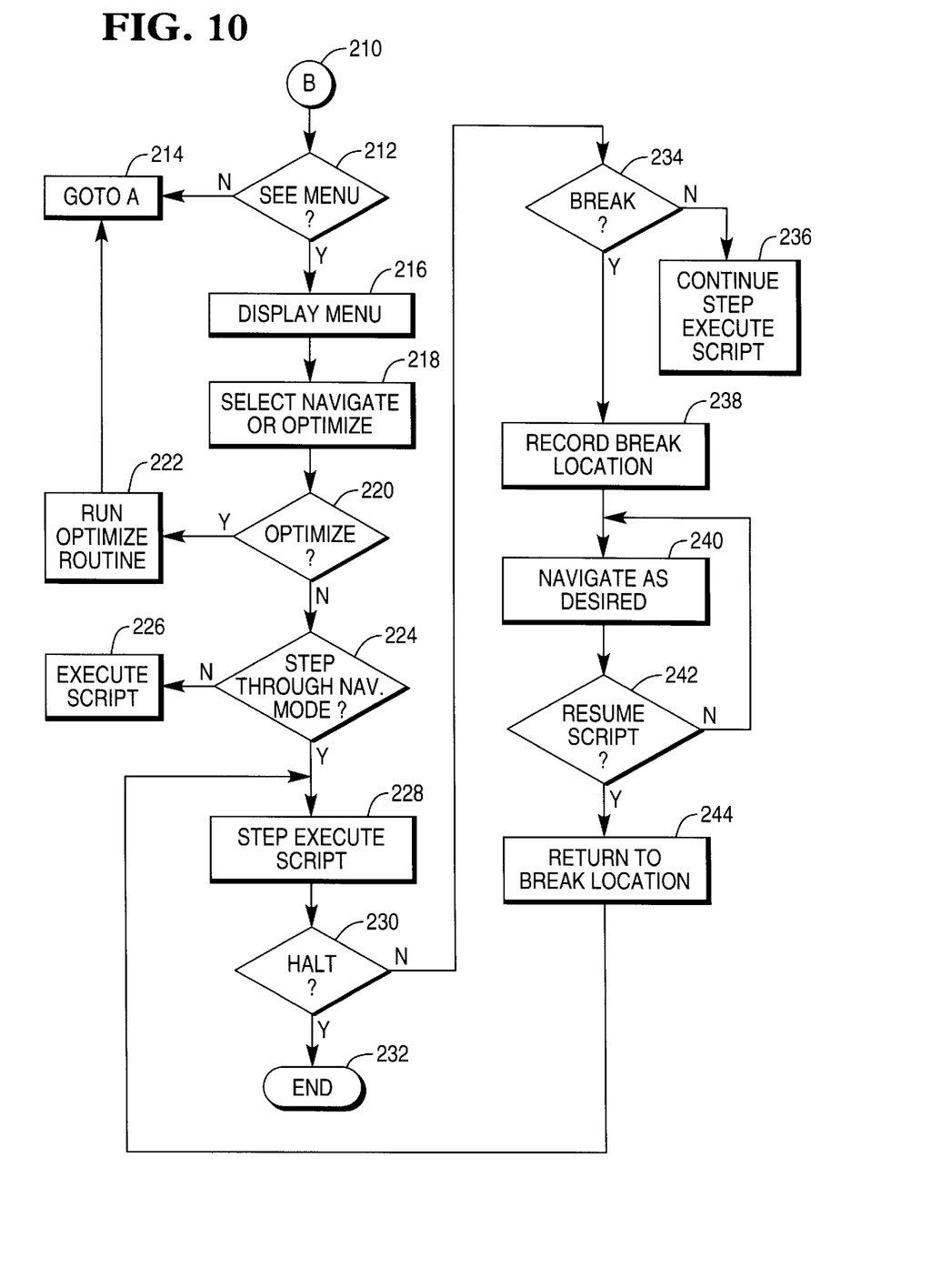

Turning now to FIGS. 9 and 10, there is illustrated in flow diagram form various processing steps associated with enhancing navigation of an on-line multiple-resource information system, such as the Internet, by employing a navigation agent. In one embodiment of the navigation agent, a software program is executed by the computer 82 upon user-activation of a hot key or double clicking on an appropriate icon presented on the display 84. The software program may be executable by the computer 82 as a terminate-and-stay-resident (TSR) program, which resides in random access memory and is immediately activatable upon hitting an appropriate hot key or by clicking on an appropriate icon. It is to be understood that the navigation agent may be activated at any time during normal operation of the computer 82, and at any time during navigation of an on-line multiple-resource information service. Further, the navigation agent may be activated during all or a portion of a search session for purposes of recording or executing a navigation script.

At step 180, the navigation agent is loaded into the memory of the computer 82, which may occur during at boot-up. It is assumed for purposes of illustration, that a user has initiated a search session and is currently navigating an on-line information service at step 182. At step 184, the hot key or icon required to activate the navigation agent is monitored in a typical manner. If the icon or hot key is not activated by the user, as indicated at step 186, navigation of the on-line information system continues unaffected by the navigation agent at step 188. If, at step 186, the navigation agent icon or hot key is activated, the user has the option to initiate recording of navigation information at step 190.

Upon responding in the affirmative, the navigation agent effects recording of navigation information beginning with the current location at step 192. The user then navigates the information system as desired at step 194, with input device parameters being recorded concurrently at step 196. At any time during the search session, the user may activate an appropriate hot key or icon to terminate the recording at step 198. At step 200, a user may categorize the recorded navigation information in a manner previously described with respect to FIG. 8. The categorized navigation information may then be stored in a bookshelf or collection of navigation information at step 202. If desired, the user may continue navigating the information system at step 182.

In one embodiment, if a user does not wish to record navigation information as tested at step 190, an option may be provided for displaying a navigation agent menu at step 212. A menu is displayed at step 216 which permits a user to select between navigate or optimize options, as indicated at step 218. If a user does not wish to see the navigation agent menu at step 212, the user may continue to navigate the information system as indicated at step 182. If, at step 220, the user selects the optimize option presented on the display menu, an optimization routine is executed to eliminate navigation path redundancies at step 222. If the user decides against selecting the optimize option at step 220, a further inquiry at step 224 queries whether the user wishes to execute a previously stored navigation script in a step-through mode of navigation. Alternatively, the selected navigation script may be executed in full at step 226, thereby executing the navigation script until the end destination is reached.

Having selected the step-through navigation mode of execution at step 224, the navigation script is step-executed at step 228. Step-through execution of a navigation script involves processing only a portion of the navigation script, and then allowing the user to evaluate the information or options presented incrementally along the scripted navigation route. Referring to FIG. 6, for example, step-through navigation of the path beginning at location A0 130 and terminating at location D2 146 proceeds by advancing from location A0 130 to location A1 132, and then temporarily halting execution of the navigation script. After temporarily suspending step-through execution of the navigation script at location A1 132, actuation of an appropriate hot key or screen icon instructs the navigation agent to execute the next portion of the navigation script which, in this illustrative example, results in branching from location A1 132 to location B0 134.

Execution of the navigation script is once again temporarily suspended at location B0 134, thereby permitting a user to review the information provided at that location. The information at this or other locations indicated in FIG. 6 may include WEB homepage information, document information, or other Internet information. Step-through execution of the navigation script is resumed by actuation of an appropriate hot key or screen icon. Step-through execution of the navigation script continues in this manner until the end destination is reached, which in this example is represented as location D2 146.

At any time during step-through execution of a navigation script, a user may halt execution of the script at step 230 and terminate the navigation session at step 232. A user may also temporarily break from the navigation path at any time, as indicated at step 234. Actuation of an appropriate hot key or screen icon at step 234 effectuates a temporary break in the execution of a navigation script. The location at which the temporary break occurs is recorded at step 238, preferably in random access memory of the computer 82. The user may then further navigate the information service as desired at step 240, or, alternatively, perform some other task or execute other application software. Execution of the navigation script may be resumed at step 242 by recalling the break location recorded at step 238, and returning to the break location at step 244. Step-through execution of the navigation script then continues at step 228.

If in the course of a search or progression through a navigation path the navigation agent encounters a "socket refused" condition due to high traffic or other anomalous Internet condition, execution of the navigation script is temporarily halted until the anomalous condition is resolved or, alternatively, when desired by the user. The navigation agent may alternatively re-start any halted search automatically from a designated homepage or other pre-established initiation location.

In another embodiment, a researcher may initiate execution of a navigation script, break at some intermediate point within the navigation script, activate the record mode, and record subsequent navigation information while proceeding along a new search path. Upon reaching a desired end destination, the user may terminate recording, store the modified navigation script under a new name, and categorize the modified navigation script in an appropriate manner for inclusion in the script bookshelf 160.

It will, of course, be understood that various modifications and additions can be made to the embodiments discussed hereinabove without departing from the scope or spirit of the present invention. The navigation agent of the present invention may be employed for purposes other than those associated with research. For example, the navigation agent may be utilized by WEB homepage developers when establishing and testing hypertext links. Accordingly, the scope of the present invention should not be limited to the particular embodiments discussed above, but should be defined only by the claims set forth below and equivalents thereof.

What is claimed is:

1. A method for enhancing computer-implemented navigation of an on-line multiple-resource information service utilizing a navigation agent, comprising the steps of:

recording navigation information while navigating the information service, wherein the navigation information identifies each location in the on-line resource information service that was traversed while navigating, and wherein the information service is comprised of multiple resources connected to each other and to a computer by one or more networks;

categorizing the recorded navigation information to associate the recorded navigation information with previously recorded navigation information;

optimizing the recorded navigation information to remove multiples of the same locations within the navigation information; and traversing a navigation path at a pre-established time of day by stepping through the locations recorded in the navigation information.

2. The method of claim 1, wherein the traversing step further comprises the step of recording new navigation information while traversing the navigation path.

3. The method of claim 2, wherein the new navigation information is appended to the recorded navigation information.

4. The method of claim 1, further comprising the steps of:

traversing the navigation path to retrieve a document;

comparing the retrieved document to an earlier version of the retrieved document; and storing the more current of either one of the retrieved document and the earlier version of the retrieved document.

5. The method of claim 1, wherein the step of recording the navigation information comprises the step of recording computer input device information.

6. The method of claim 1, wherein the step of recording the navigation information comprises the step of recording display location parameters associated with activatable control locations on a display.

7. The method of claim 1, wherein the step of recording the navigation information comprises the step of recording information service address information.

8. The method of claim 1, wherein the step of optimizing further comprises the step of eliminating redundant navigation information from the recorded navigation information.

9. An apparatus, including a computer coupled to a display and a user-actuatable input device, for navigating an on-line multiple-resource information service utilizing a navigation agent, comprising:

recording means for recording navigation information corresponding to information produced by the input device while navigating the information service, wherein the navigation information identifies each location in the on-line resource information service that was traversed while navigating, and wherein the information service is comprised of multiple resources connected to each other and to the computer by one or more networks;

categorizing means for categorizing the recorded navigation information to associate the recorded navigation information with a collection of previously recorded navigation information;

optimizing means for optimizing the recorded navigation information to remove multiples of the same locations within the navigation information; and processing means for processing navigation information selected from the collection of previously recorded navigation information to traverse the optimized navigation path at a pre-established time of day, by stepping through the locations recorded in the navigation information.

10. The apparatus of claim 9, wherein the processing means comprises means for processing the optimized navigation information in a step-through manner.

11. The apparatus of claim 9, wherein the recording means comprises means for recording scaling parameters associated with a scalable window of the display containing a control responsive to the input device.

12. The apparatus of claim 11, wherein the processing means comprises means for associating the window scaling parameters with the information produced by the input device to effect traversing of the navigation path.

13. The apparatus of claim 9, wherein the recording means comprises means for recording cursor position parameters associated with corresponding activatable control locations on the display.

14. The apparatus of claim 9, further comprising optimization means for eliminating redundant navigation information from the recorded navigation information.

15. The apparatus of claim 9, further comprising update means for updating a document previously retrieved from the information service.

16. A computer program storage medium, readable by a computer, and tangibly embodying program instructions which when performed by the computer effectuate a method for navigating an on line multiple resource information service utilizing a navigation agent, comprising the steps of:

recording navigation information while navigating an on-line multiple-resource information service, wherein the navigation information identifies each location in the on-line resource information service that was traversed while navigating, and wherein the information service is comprised of multiple resources connected to each other and to the computer by one or more networks;

categorizing the recorded navigation information to associate the recorded navigation information with previously recorded navigation information;

optimizing the recorded navigation information to remove multiples of the same locations within the navigation information; and traversing a navigation path at a pre-established time of day by stepping through the locations in the navigation information.

17. The method of claim 16, wherein the step of recording the navigation information comprises the step of recording computer input device information.

18. The method of claim 16, wherein the step of recording the navigation information comprises the step of recording information service address information.

19. The method of claim 16, wherein the step of optimizing further comprises the step of eliminating redundant navigation information from the recorded navigation information.

* * * * *